(12) United States Patent
Narasimalu et al.

(10) Patent No.: US 7,901,196 B2
(45) Date of Patent: Mar. 8, 2011

(54) MOLDING APPARATUS INCORPORATING PRESSURE UNIFORMITY ADJUSTMENT

(75) Inventors: Srikanth Narasimalu, Singapore (SG); Sathish Kumar Balakrishnan, Singapore (SG); Ning Ying, Singapore (SG); Shu Chuen Ho, Singapore (SG)

(73) Assignee: ASM Technology Singapore Pte Ltd, Singapore (SG)

( * ) Notice: Subject to any disclaimer, the term of this patent is extended or adjusted under 35 U.S.C. 154(b) by 577 days.

(21) Appl. No.: 12/041,140

(22) Filed: Mar. 3, 2008

(65) Prior Publication Data

US 2009/0220629 A1 Sep. 3, 2009

(51) Int. Cl.
*B29C 45/14* (2006.01)
*H01L 21/56* (2006.01)

(52) U.S. Cl. ............ 425/116; 425/125; 425/129.1; 425/451.7; 425/590; 425/595

(58) Field of Classification Search ............ 425/116, 425/125, 129.1, 451.7, 451.9, 590, 595
See application file for complete search history.

(56) References Cited

U.S. PATENT DOCUMENTS

| | | | | | |
|---|---|---|---|---|---|
| 3,327,353 | A | * | 6/1967 | Eggenberger | 425/451.7 |
| 4,535,689 | A | * | 8/1985 | Putkowski | 425/451.7 |
| 5,269,998 | A | * | 12/1993 | Takagi et al. | 425/589 |
| 5,766,650 | A | * | 6/1998 | Peters et al. | 425/116 |
| 5,989,471 | A | * | 11/1999 | Lian et al. | 425/116 |
| 6,030,569 | A | * | 2/2000 | Yu | 425/451.7 |
| 7,293,981 | B2 | * | 11/2007 | Niewels | 425/555 |
| 7,594,808 | B2 | * | 9/2009 | Eiha et al. | 425/451.7 |

FOREIGN PATENT DOCUMENTS

| | | | |
|---|---|---|---|
| JP | 09-076319 | | 3/1997 |
| JP | 10-12649 | * | 1/1998 |
| JP | 2005-28704 | * | 2/2005 |

\* cited by examiner

*Primary Examiner* — James Mackey

(74) *Attorney, Agent, or Firm* — Ostrolenk Faber LLP (57) ABSTRACT

A molding apparatus comprises first and second mold chases that are configured to clamp an electronic device therebetween, and a driving mechanism which drives the first and second mold chases to apply a clamping force onto the electronic device. A pressure adjustment mechanism communicates with at least one of the mold chases and applies an additional clamping pressure onto one or more portions of the mold chase. The pressure adjustment mechanism comprises movable supports that are displaceable in directions which are substantially perpendicular to the direction of the clamping force so as to transmit and apply the said additional clamping pressure onto the mold chase, and also a plurality of piezoelectric actuators which are operative to apply displacement forces to the movable supports in their displacement directions.

20 Claims, 9 Drawing Sheets

MOLDING APPARATUS INCORPORATING PRESSURE UNIFORMITY ADJUSTMENT

FIELD OF THE INVENTION

The present invention relates to the molding of electronic devices, and in particular to the distribution of a uniform clamping pressure during molding of electronic devices.

BACKGROUND AND PRIOR ART

A molding apparatus typically comprises top and bottom mold chases which are made of hard steel with the top and bottom mold chases mounted on top and bottom platens respectively. Molding dies are mounted on the mold chases and each molding die may include mold cavities to mold encapsulation compound onto an electronic device. The top and bottom platens are supported substantially at the corners of the mold chases by four columns (one column at each corner) whereat mechanical pressure is applied to create a clamping force throughout the molding die.

Molding is commonly conducted at a high transfer pressure of more than 6 bar followed by an even higher packing pressure to minimise voids in the molded electronic device. A higher clamping pressure along the edges of mold cavities on a carrier such as a lead frame ensures that there is no leakage of the molding compound and gives rise to more effective packing of the compound within the mold cavities. However, for molding dies that are designed to mold a matrix of electronic devices, a lower clamping pressure is experienced by the lead frame at a clamping zone near the centers of the molding dies such that mold flash or bleeding may occur for these electronic devices, whereas electronic devices along the edges of the lead frame which encounter higher clamping pressure will not encounter mold flash or bleeding. It would therefore be advantageous to enhance the uniformity in clamping pressure throughout the lead frame so that mold flash or bleeding may be avoided for the centrally-located mold cavities.

Figure 1:
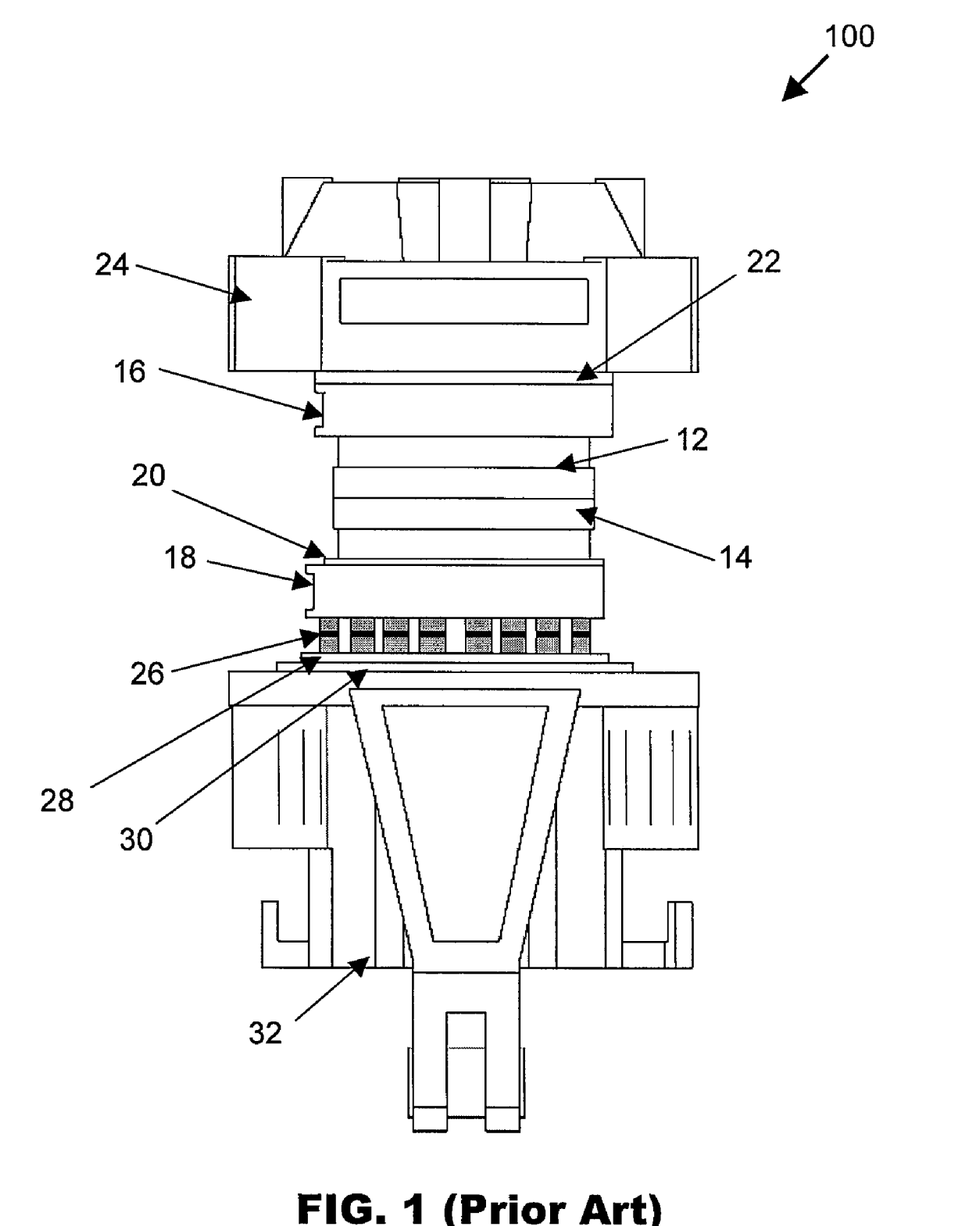
FIG. 1 is a side view of a conventional molding apparatus.

A side view of a conventional molding apparatus 100 is shown in FIG. 1. Top and bottom mold chases 12, 14 are located between top and bottom heater plates 16, 18. The bottom mold chase 14 is further supported on a packing plate 20. Above the top heater plate 16 is a top insulating plate 22. A top platen 24 is drivable onto the top heater plate 16 and the top and bottom mold chases 12, 14. The bottom mold chase 14 is supported by a plurality of supporting steel pillars 26 in the form of steel rods or springs. The supporting steel pillars 26 improve the uniformity of clamping force on the molding dies such that the lead frame is clamped more uniformly along its length to reduce leakage of the molding compound. The molding apparatus 100 further comprises a bottom insulating plate 28, a base plate 30 and a bottom platen 32.

Uneven pressure distribution may be experienced by the electronic devices using the conventional molding apparatus 100 even with the presence of the supporting steel pillars 26. Due to manufacturing constraints, parts of the molding apparatus 100 may have tolerances resulting in non-uniform gaps between the supporting steel pillars 26. The supporting steel pillars 26 on their own may not provide uniform clamping pressure on the electronic devices if there are gaps as their lengths are fixed. Therefore, the problem of uneven clamping pressure remains. Bleeding or mold flash may thus still occur for a molding apparatus incorporating the supporting steel pillars 26.

It has been found that varying the relative dimensions of the supporting steel pillars 26 may provide a more even pressure distribution on the lead frame. However, these variations may not be adequate to cater for different clamping pressures, which necessitate different degrees of compensatory deformations on the surface of the bottom mold chase 20.

To overcome the aforesaid problems, piezoelectric materials have been incorporated in molding apparatus to facilitate adjusting the height distribution along the molding surface so as to allow adjustment of the overall pressure distribution. A prior art example of an apparatus which uses piezoelectric materials to regulate the clamping pressure is described in Japanese Publication No. 09-076319 entitled "Resin Mold Device". This publication discloses pressure adjusting means which comprises an actuator made of piezoelectric materials and which is located below supporting rods. The piezoelectric actuator acts in the mold closing direction and controls the displacement of the mold through individual piezoelectric rods. By varying the lengths of the piezoelectric rods and thereby adjusting the pressure at chosen locations on the molding die, a more uniform clamping pressure can be achieved.

Piezoelectric materials in the piezoelectric actuator should have a relatively high Curie temperature and be able to withstand a relatively high working temperature of about 400° C. that is required for molding. By applying an appropriate bias electrical voltage, the piezoelectric materials extend or contract to varying degrees on the supporting steel rods to achieve the relative dimensions which are required for a more even pressure distribution. The degree of extension of the piezoelectric material provides feedback as to the appropriate force to be applied thereto as the stiffness of the piezoelectric material is known beforehand. However, in the said prior art, the load of the molding dies, the supporting platens as well as other structures above the molding dies act directly on the piezoelectric materials. This is undesirable since piezoelectric materials are made of relatively fragile materials such as ceramic and may be easily damaged. It is therefore desirable to devise a way of changing the clamping force distribution along the mold surface without exerting a direct load on the piezoelectric materials.

SUMMARY OF THE INVENTION

It is thus an object of this invention to seek to provide a molding apparatus which improves the uniformity in clamping pressure when molding electronic devices without the disadvantages of the prior art as outlined above.

Accordingly, the invention provides a molding apparatus comprising: first and second mold chases that are configured to clamp an electronic device therebetween; a driving mechanism that is operative to drive the first and second mold chases to apply a clamping force onto the electronic device; and a pressure adjustment mechanism in communication with at least one of the mold chases and which is operative to apply an additional clamping pressure onto one or more portions of the mold chase; wherein the pressure adjustment mechanism further comprises movable supports that are displaceable in directions which are substantially perpendicular to the direction of the clamping force to thereby transmit and apply the said additional clamping pressure onto the mold chase, and a plurality of piezoelectric actuators which are operative to apply displacement forces to the movable supports in their displacement directions.

It would be convenient hereinafter to describe the invention in greater detail by reference to the accompanying drawings which illustrate embodiments of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiments of the invention when considered with the accompanying drawings, in which.

DETAILED DESCRIPTION OF THE PREFERRED EMBODIMENT OF THE INVENTION

The preferred embodiments of the present invention will be described hereinafter with reference to the accompanying drawings.

Figure 2:
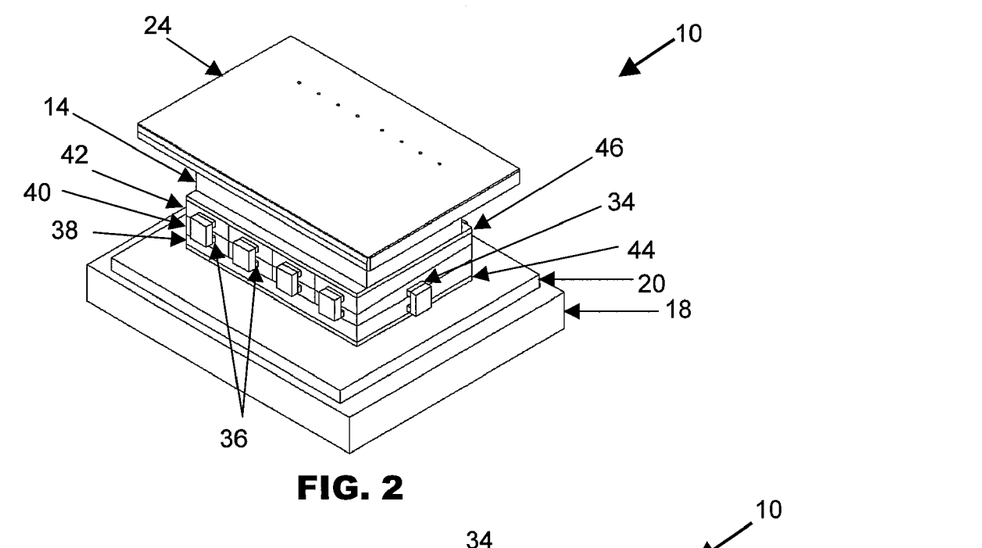
FIG. 2 is an isometric view of top and bottom mold chases of a molding apparatus showing piezoelectric actuators and movable supports of a pressure adjustment mechanism in accordance with a first preferred embodiment of the invention.

FIG. 2 is an isometric view of top and bottom mold chases 12, 14 of a molding apparatus 10 showing piezoelectric actuators 34, 36 and three layers of movable supports 38, 40, 42 in accordance with a first preferred embodiment of the invention. The top and bottom mold chases 12, 14 are driven by a driving mechanism, including top and bottom platens 24, 32, which applies a clamping force onto an electronic device such as a lead frame positioned in between the mold chases 12, 14. A pressure adjustment mechanism comprising the movable supports 38, 40, 42 and piezoelectric actuators 34, 36 is mounted adjacent to the bottom mold chase 14 and applies an additional clamping pressure onto one or more portions of the mold chase 14 during molding. The movable supports are configured to be displaceable in directions which are substantially perpendicular to the direction of the clamping force for transmitting and applying the additional clamping pressure onto the mold chase 14. In order to move the movable supports 38, 40, 42, the piezoelectric actuators 34, 36 apply displacement forces to the movable supports 38, 40, 42 in their displacement directions.

There are preferably multiple layers of movable supports 38, 40, 42 located below the bottom mold chase 14, comprising at least a first support layer 38, and a second support layer 42. The first support layer 38, which may comprise a single movable support, is movable along a first axis, for instance the X axis. The second support layer 42, which may comprise a plurality of movable supports extending adjacent to the first support layer, is parallel to the first support layer and is movable along a second axis which is orthogonal to the first axis, for instance the Y axis. These first and second axes are substantially perpendicular to the direction of the clamping force, which may be in the Z axis. The third support layer 40, located between the first and second support layers 38, 42, is preferably movable in both the first and second orthogonal axes (XY axes), and configured to be slidable relative to the first and second support layers 38, 42 respectively in opposite directions to the displacement directions of the first and second support layers during operation. The three support layers 38, 40, 42 are preferably in contact with one another and are closely packed.

The piezoelectric actuators 34, 36 may be arranged such that a first set of piezoelectric actuators 34 is connected only to the first and third support layers 38, 40 and a second set of piezoelectric actuators 36 is connected only to the second and third support layers 42, 40. In the illustration, the first set of piezoelectric actuators 34 comprises a pair of actuators, one on each side of the molding apparatus 10. The second set of piezoelectric actuators 36 comprises eight actuators, with four on each side of the molding apparatus 10.

The movable supports 38 of the first support layer 38 are slidably mounted to a lower protective plate 44 that rests on the bottom plate 20 and are slidable with respect to the protective plate 44. The lower protective plate 44 reduces wear and tear of the first layer of movable supports 38 during sliding motion. Likewise, an upper protective plate 46 is mounted to an opposite side of the movable supports 38 on top of the second support layer 42 and is slidable with respect to movable supports 38, 40, 42. The bottom heater plate 18 together with the upper heater plate 16 provide the working temperature for molding. The top platen 24 exerts a clamping load on the top mold chase 12.

Figure 3:
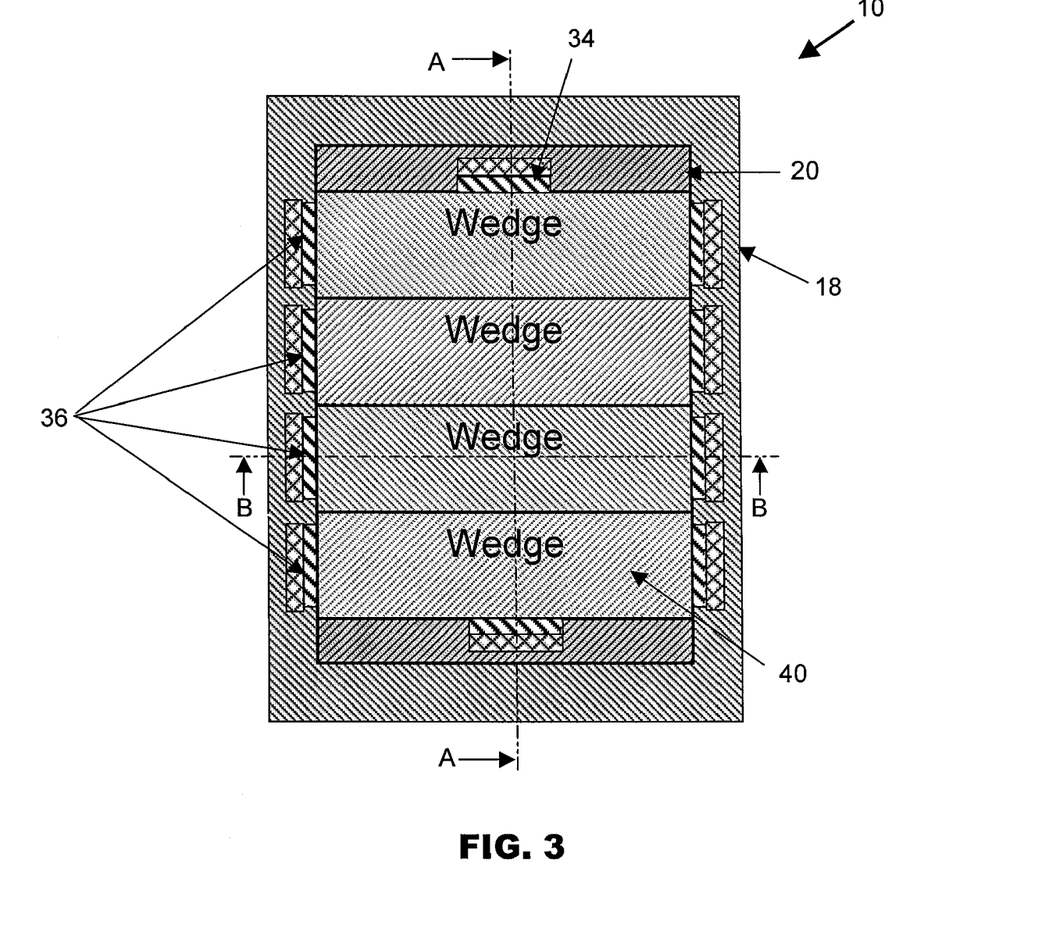
FIG. 3 is a top view of the pressure adjustment mechanism illustrating the arrangement of first and second sets of piezoelectric actuators along the sides of the movable supports.

FIG. 3 is a top view of the pressure adjustment mechanism illustrating the arrangement of the first and second sets of piezoelectric actuators 34, 36 along the sides of the third layer of movable supports 40. The first set of piezoelectric actuators 34 are positioned on opposite sides of the width of the first and third layers of movable supports 38, 40. The second set of piezoelectric actuators 36 are found on opposite sides of the lengths of the second and third layers of the movable supports 42, 40.

Figure 4:
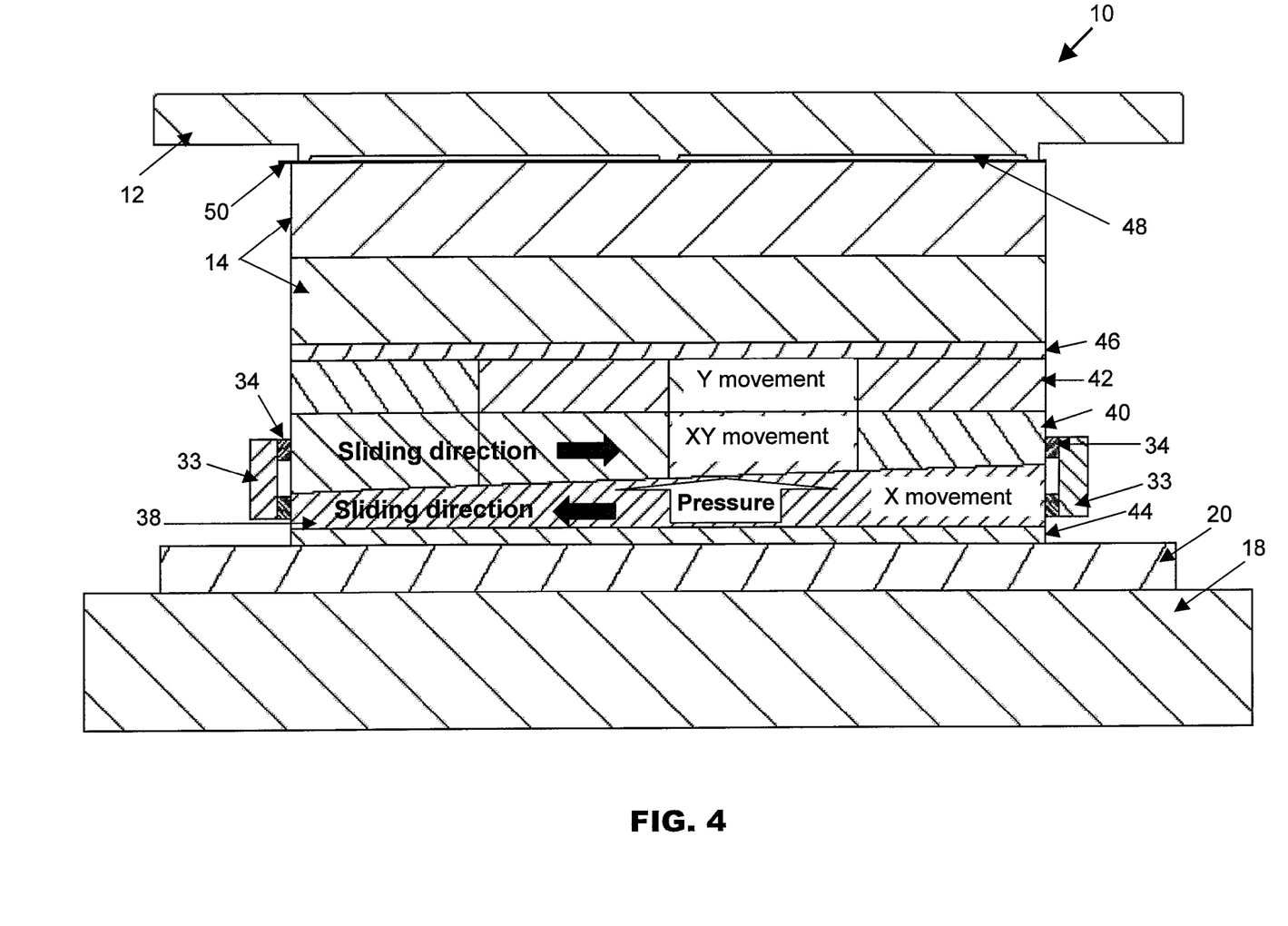
FIG. 4 is a sectional side view of the piezoelectric actuators and movable supports viewed along sectional line A-A of FIG. 3 illustrating the motion directions of each layer of the movable supports.

FIG. 4 is a sectional side view of the piezoelectric actuators 34 and movable supports 38, 40, 42 viewed along sectional line A-A of FIG. 3 illustrating the motion directions of each layer of the movable supports 38, 40, 42. Each movable support 38, 40, 42 is preferably formed in the shape of a wedge, such that an inclined surface of the wedge is facing the top and/or bottom mold chases 12, 14. The movable supports 38, 40, 42 should be made of material of higher heat conductivity than the piezoelectric actuators 34, 36 so that heat transfer to the mold chase 12, 14 can be improved. Each layer of movable supports 38, 40, 42 can be individually controlled by the piezoelectric actuators 34, 36. The first layer of movable supports 38 may comprise a single wedge while the second and third layers of movable supports 42, 40 may comprise a plurality of wedges divided into individually controllable support sections.

Concurrent actuation by the first set of piezoelectric actuators 34 on the first and third layers of movable supports 38, 40 result in the movable supports 38, 40 sliding in opposite directions. Each of the piezoelectric actuators 34 is held by a support structure 33 which should be rigidly fixed in position, such as by connecting it to the packing plate 20. This prevents the support structure 33 from rotating during expansion and contraction of the piezoelectric actuators 34. More details of the actuation by the first set of piezoelectric actuators 34 are described with respect to FIGS. 6A and 6B. This view also illustrates an electronic device in the form of a lead frame 50 being clamped in the mold cavity 48 between the top and bottom mold chases 12, 14.

Figure 5:
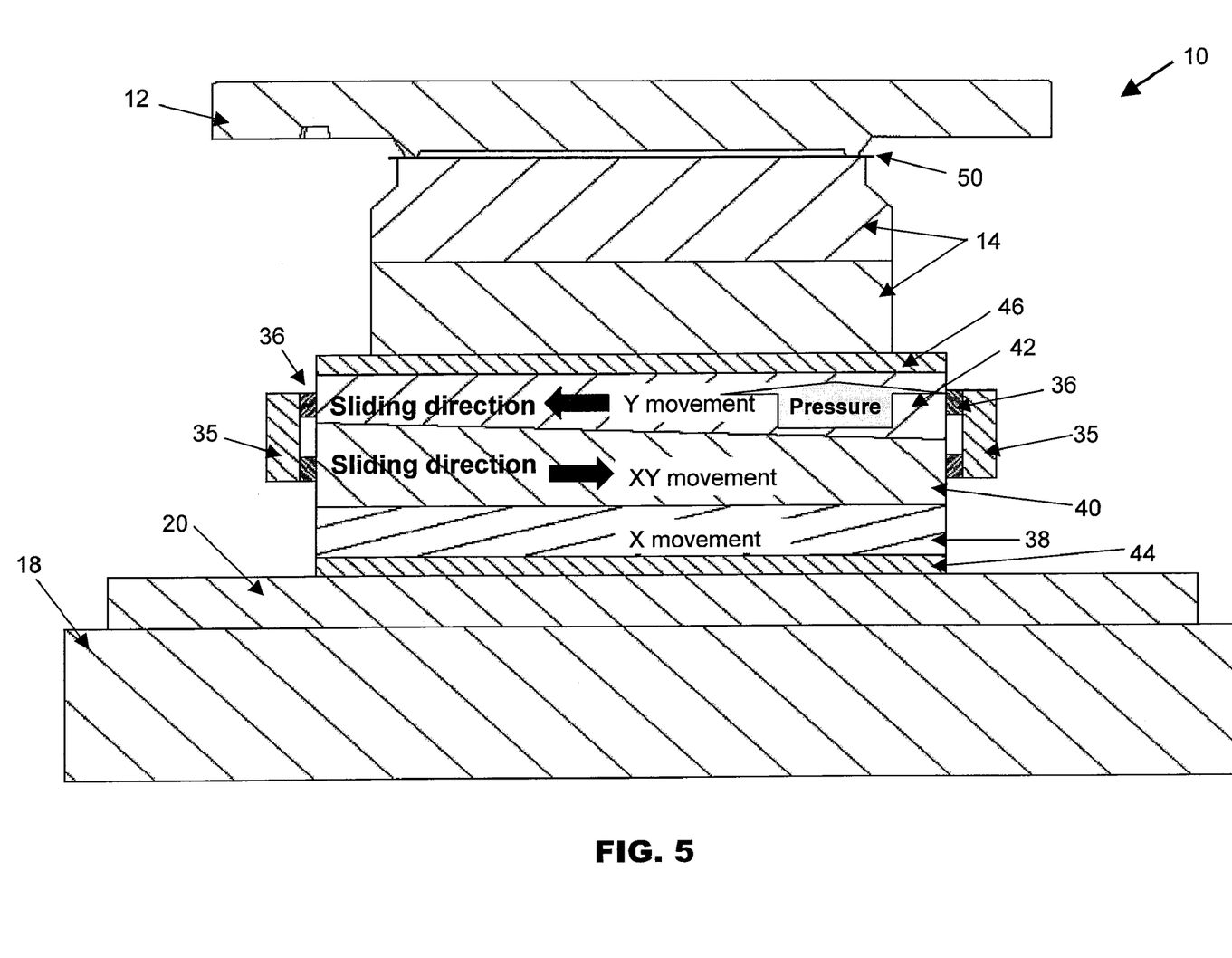
FIG. 5 is a sectional side view of the piezoelectric actuators and movable supports viewed along sectional line B-B of FIG. 3 illustrating the motion directions of each layer of the movable supports.

FIG. 5 is a sectional side view of the piezoelectric actuators 36 and movable supports 38, 40, 42 viewed along sectional line B-B of FIG. 3 illustrating the motion directions of each layer of the movable supports 38, 40, 42. The first set of piezoelectric actuators 34 act on the wedges of the first and third layers of movable supports 38, 40 in unison. Each pair of actuators comprised in the second set of piezoelectric actuators 36 act on opposite sides of each wedge in the second and third layers of movable supports 42, 40. Concurrent actuation by the second set of piezoelectric actuators 36 on the second and third layers of movable supports 42, 40 result in the movable supports 42, 40 sliding in opposite directions.

As for FIG. 4, each piezoelectric actuator 36 is held rigidly in position by a support structure 35 which is in turn rigidly fixed to prevent it from rotating during expansion and contraction of the piezoelectric actuators 36. More details of the actuation by the second set of piezoelectric actuators 36 are described with respect to FIGS. 7A and 7B. The relative sliding motions of the movable supports 40, 42 bring about an upward pressure on a selected portion of the bottom mold chase 14 which serves to improve the uniformity of the clamping pressure exerted on the lead frame 50. Thus, the second layer of movable supports 40 are slidable in both the X and Y directions as this layer is acted on by both the first and second sets of piezoelectric actuators 34, 36.

Figure 6A:
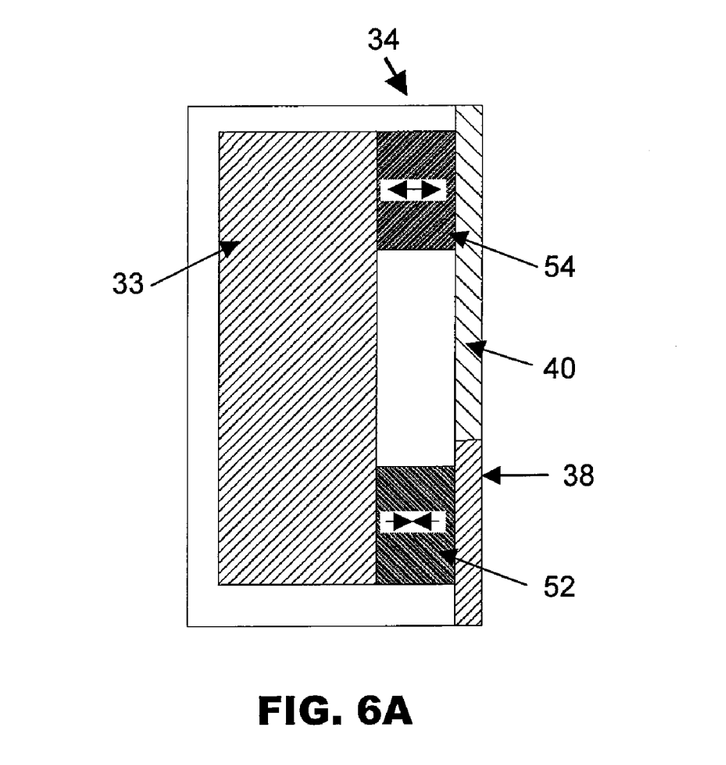
FIGS. 6A and 6B show respectively the first set of piezoelectric actuators shown in FIG. 4 which are located at opposite sides of the movable supports.
Figure 6B:
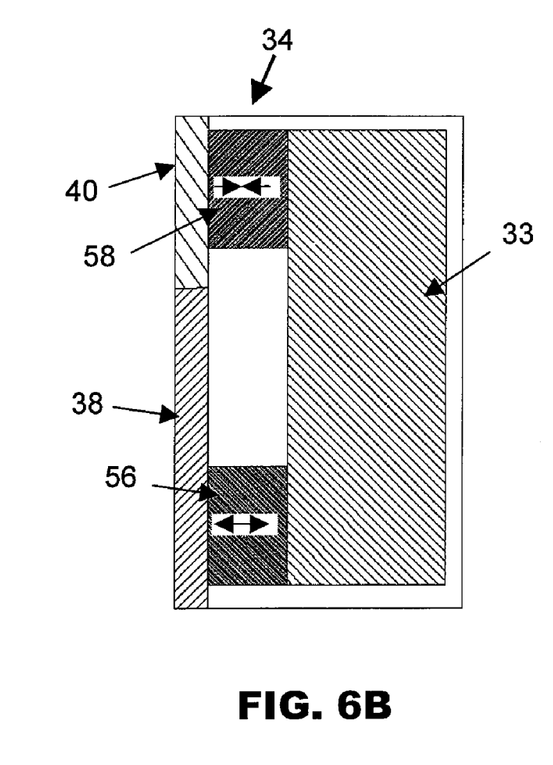

FIGS. 6A and 6B show respectively the first set of piezoelectric actuators 34 shown in FIG. 4 located at opposite sides of the movable supports 38, 40. In FIG. 6A, the piezoelectric actuator 34 comprises first and second piezoelectric segments 52, 54 which are affixed to the first and third layers of movable supports 38, 40 respectively. In FIG. 6B, the piezoelectric actuator 34 comprises third and fourth piezoelectric segments 56, 58 which are affixed to opposite sides of the first and third layers of movable supports 38, 40 respectively. Electric voltages applied to the piezoelectric segments causes the first piezoelectric segment 52 to contract while the third piezoelectric segment 56 expands. At the same time, the second piezoelectric segment 54 expands while the fourth piezoelectric segment 58 contracts. The effect of the aforesaid expansion and contraction of the four piezoelectric segments result in the first layer of movable supports 38 sliding towards the left as shown in FIG. 4. At the same time, the multiple sections of wedges in the third layer of movable supports 40 slide towards the right on top of the first layer of movable supports 38. The concurrent actuation by the piezoelectric segments 52, 54, 56, 58 results in upward pressure being exerted on the bottom mold chase 14 through the upper protective plate 46. This upward pressure serves to distribute a more uniform pressure onto the lead frame 50 during molding. At the same time, a closed force path is generated through the four columns connecting the top and bottom platens 24, 32 when the piezoelectric segments 52, 54, 56, 58 slide to create an additional clamping pressure between the platens 24, 32.

Figure 7A:
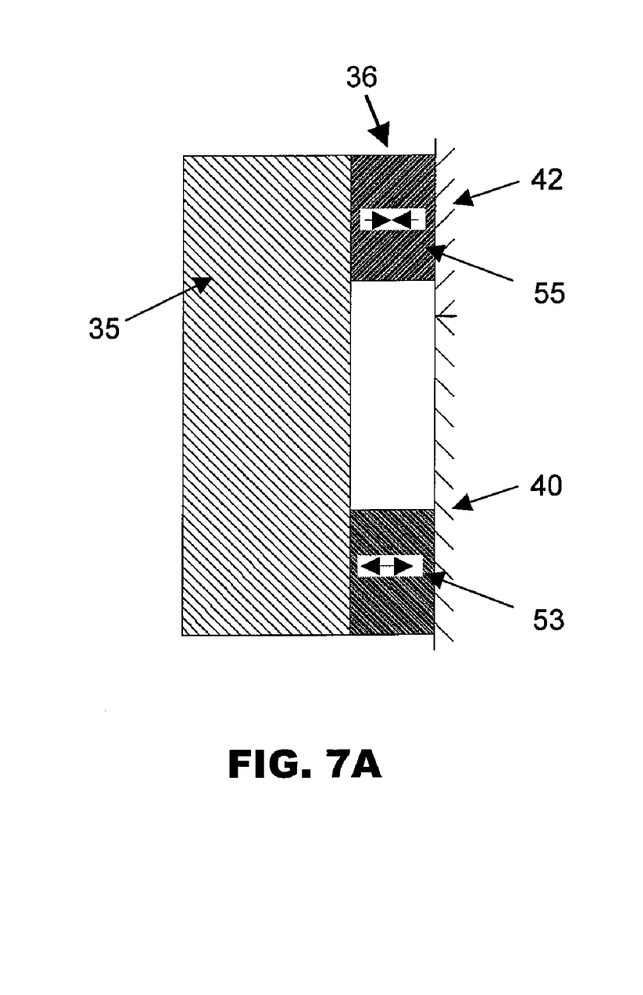
FIGS. 7A and 7B show respectively the second set of the piezoelectric actuators shown in FIG. 5 which are located at opposite sides of the movable supports.
Figure 7B:
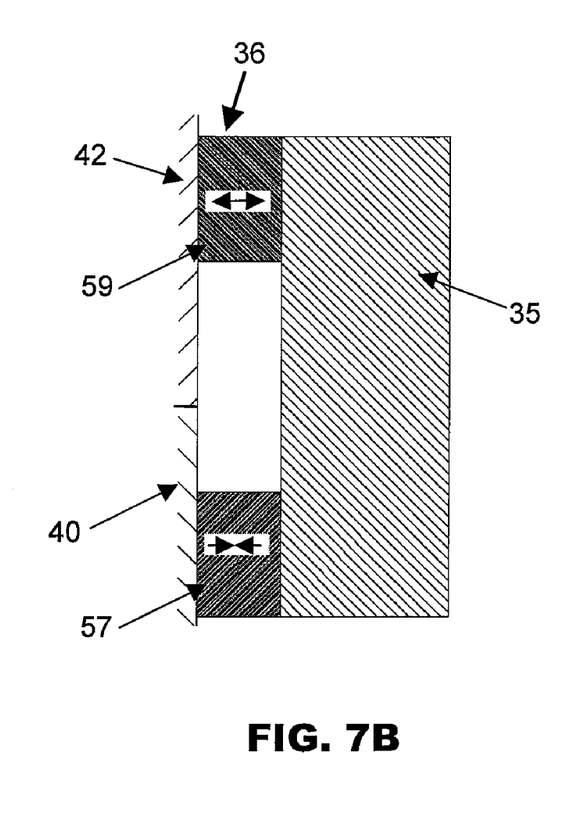

FIGS. 7A and 7B show respectively the second set of piezoelectric actuators 36 shown in FIG. 5 which are located at opposite sides of the movable supports 40, 42. In FIG. 7A, the piezoelectric actuator 36 comprises first and second piezoelectric segments 53, 55 which are affixed to the second and third layers of movable supports 42, 40 respectively. In FIG. 7B, the piezoelectric actuator 36 comprises third and fourth piezoelectric segments 57, 59 which are affixed to opposite sides of the second and third layers of movable supports 42, 40 respectively. Electric voltages applied to the piezoelectric segments cause the first piezoelectric segment 53 to expand while the third piezoelectric segment 57 contracts. At the same time, the second piezoelectric segment 55 contracts while the fourth piezoelectric segment 59 expands. The effect of the aforesaid expansion and contraction of the four piezoelectric segments result in the third layer of movable supports 40 sliding towards the right. At the same time, the entire row of the second layer of movable supports 42 slides towards the left on top of the third layer of movable supports 40. The concurrent actuation by the first to fourth piezoelectric segments result in the second layer of movable supports 42 moving left to create an upward pressure on the upper protective plate 46. The opposite sliding movements of the movable supports 40, 42 are shown in FIG. 5. An upward pressure results and acts on the bottom mold chase 14. This upward pressure serves to distribute a more uniform clamping pressure onto the lead frame 50.

Figure 8:
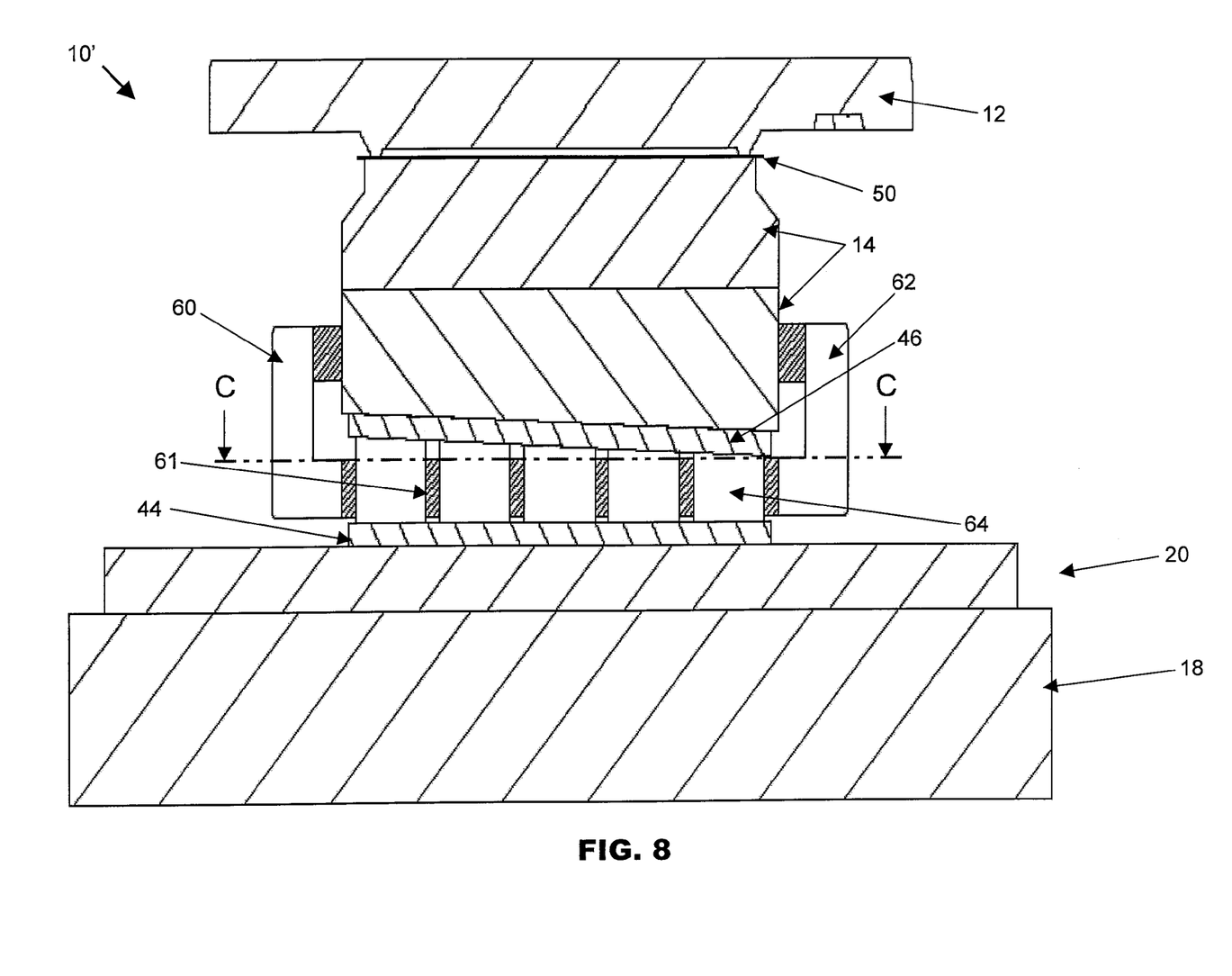
FIG. 8 is a sectional side view of a molding apparatus showing side and intermediate piezoelectric actuators and a plurality of movable supports in accordance with a second preferred embodiment of the invention.

FIG. 8 is a sectional side view of a molding apparatus 10' showing side piezoelectric actuators 60, 62 and intermediate piezoelectric actuators 61, and a plurality of movable supports 64 in accordance with a second preferred embodiment of the invention. The side piezoelectric actuators 60, 62 are symmetrically attached to opposite sides of the molding apparatus 10'. Each side piezoelectric actuator 60, 62 comprises two arms such that one arm is connected to the movable supports 64 and the other arm is connected to the bottom mold chase 14. The bottom mold chase 14 has an inclined surface facing an inclined surface of the movable supports 64, so that the movable supports 64 are slidable relative to the bottom mold chase 14. Further, the movable supports 64 comprise multiple sections of movable supports 64 which extend in rows parallel to the length of the mold chase 14, and additional intermediate piezoelectric actuators 61 connected between two adjacent sections of movable supports 64.

The load of the top and bottom mold chases 12, 14, the molding dies, the supporting platens and other structures above the molding dies act on each section of movable supports 64 but do not act directly on the intermediate piezoelectric actuators 61 as only the movable support sections 64 are in direct contact with the upper protective plate 46. This can be achieved by designing the upper contact surfaces of the movable support sections 64 and the lower contact surface of the upper protective plate 46 to slide relative to each other along a tapered slope having a gradient which is substantially less than the frictional angle of the contact surfaces between said movable support sections 64 and upper protective plate 46, the frictional angle being equivalent to the inverse tangent of the coefficient of friction. The intermediate piezoelectric actuators 61 are therefore not subjected to the direct load of the molding apparatus 10'.

Simultaneous expansion and contraction of the piezoelectric actuators 60, 62 give rise to a unidirectional push on the sections of movable supports 64 and the intermediate piezoelectric actuators 61. This provides macro control of the sliding movement of the movable support sections 64 in unison which in turn pushes the upper protective plate 46 upwards to generate a substantially uniform clamping pressure on the lead frame 50.

Figure 9:
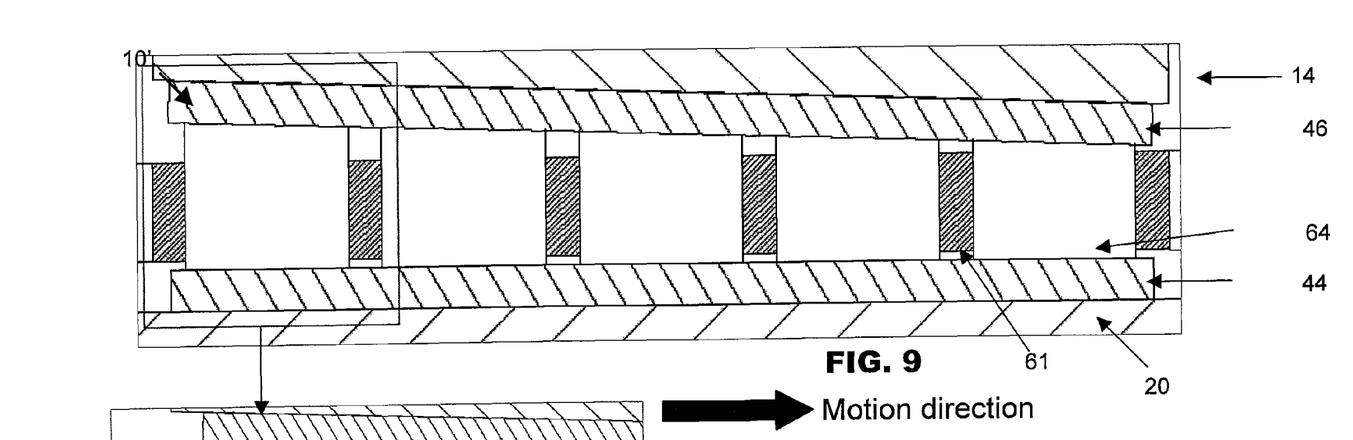
FIG. 9 is an enlarged sectional side view of the movable supports of FIG. 8.

FIG. 9 is an enlarged sectional side view of the movable supports 64 of FIG. 8. Actuation by each of the intermediate piezoelectric actuators 61 in between adjacent movable supports 64 can be individually controlled depending on the desired clamping pressure at a chosen location, thus providing an improved clamping pressure on all parts of the lead frame 50 during molding. This enables control by the intermediate piezoelectric actuators 61 at a micro level as compared to macro control by the side piezoelectric actuators 60, 62 as described above in FIG. 8. The micro control allows a fine tuning of the actuation by the intermediate piezoelectric actuators 61 on the various sections of movable supports 64 so as to provide more precise control of the clamping pressure at specific locations on the lead frame 50. In this way, each intermediate piezoelectric actuator 61 controls the position of the individual section of movable supports 64 connected to it.

Figure 10:
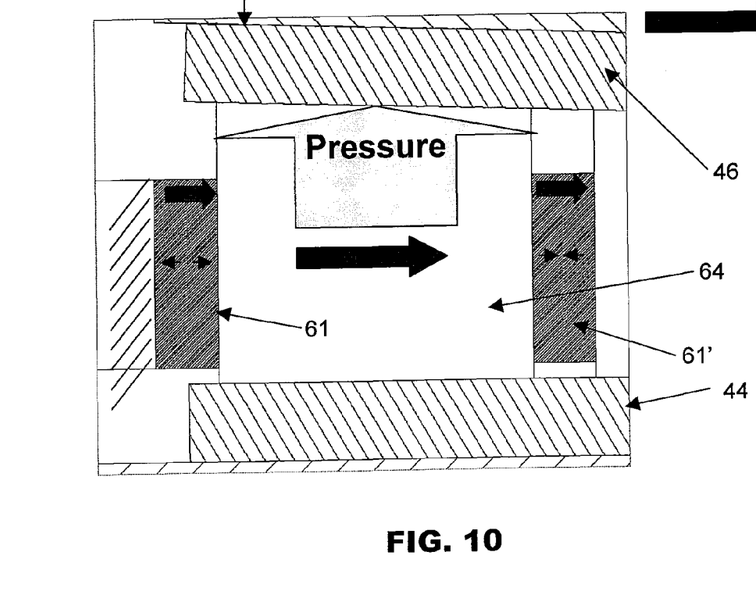
FIG. 10 illustrates intermediate piezoelectric actuators acting on a movable support of FIG. 9.

FIG. 10 illustrates intermediate piezoelectric actuators 61, 61' acting on a movable support 64 of FIG. 9. The intermediate piezoelectric actuators 61, 61' are affixed at opposite sides of the movable support 64. Electric voltages applied to these intermediate piezoelectric actuators 61, 61' expand the first intermediate piezoelectric actuator 61 and contract the second intermediate piezoelectric actuator 61', resulting in the displacement of the movable support 64 to the right of FIG. 10. This exerts an upward pressure on the upper supporting plate 46 at a localised area immediately above the movable support 64, which increases the clamping pressure on the corresponding part of the lead frame 50 in the same corresponding area. The selected intermediate piezoelectric actuators 61, 61' are actuated by an appropriate voltage that is supplied accordingly to fine-tune the clamping pressure on the lead frame 50 so as to increase or decrease an upward pressure on the lower supporting plate 46 accordingly. Therefore, the second preferred embodiment of the invention allows more precise micro-control of the clamping pressure on the lead frame 50.

Figure 11:
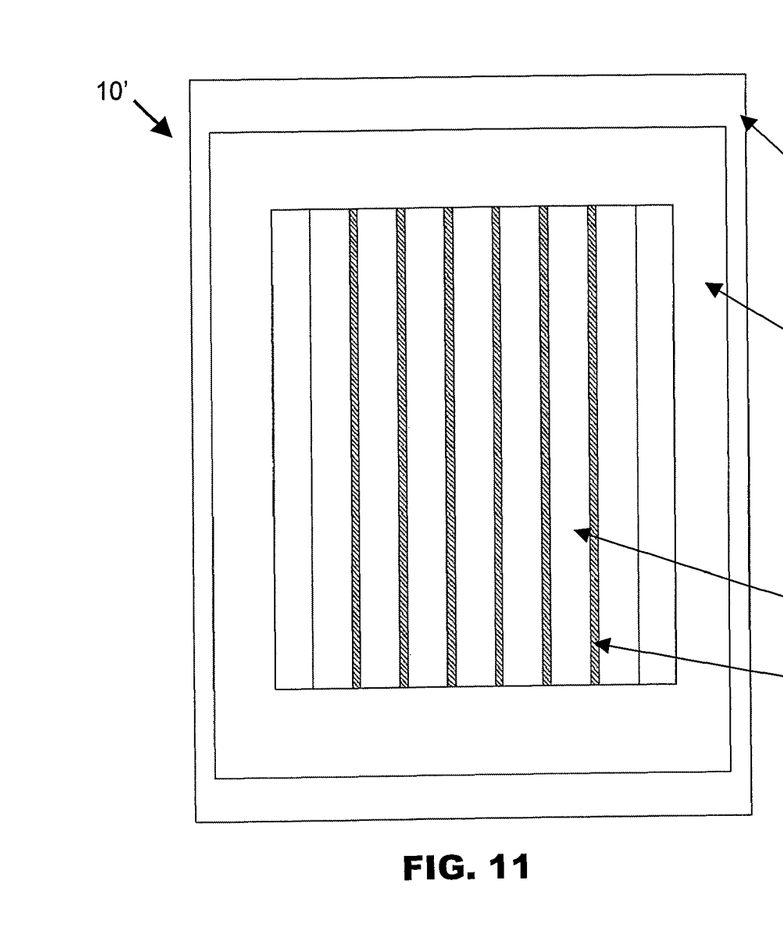
FIGS. 11 and 12 are respectively sectional top views of the intermediate piezoelectric actuators and movable support sections viewed along sectional line C-C of FIG. 8 illustrating two possible arrangements of the piezoelectric actuators and the movable supports according to the second embodiment of the invention.
Figure 12:
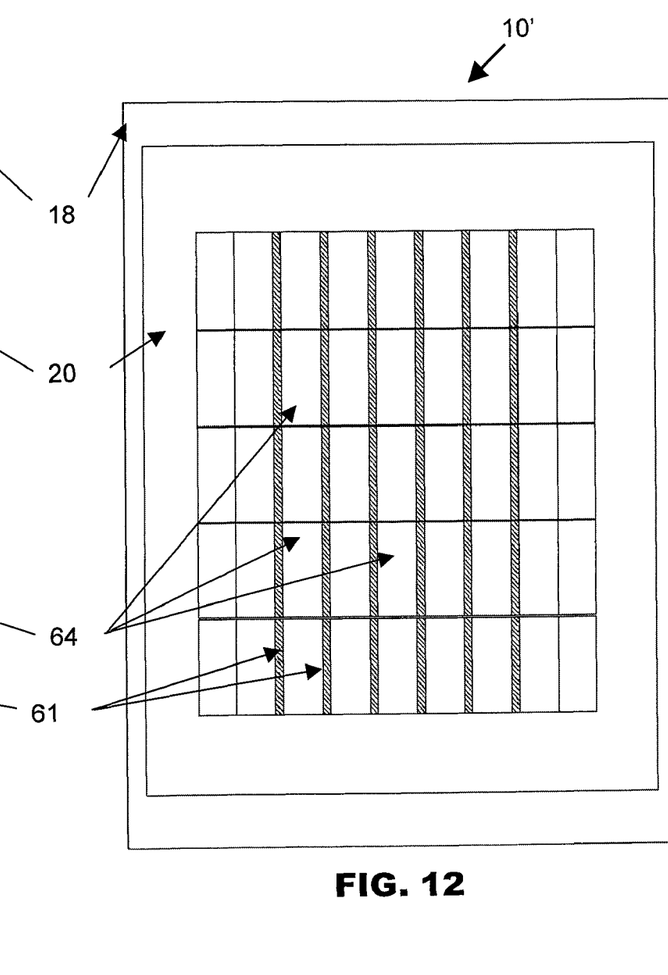

FIGS. 11 and 12 are respectively sectional top views of the intermediate piezoelectric actuators 61 and movable supports 64 viewed along sectional line C-C of FIG. 8 illustrating two possible arrangements of the intermediate piezoelectric actuators 61 and the movable supports 64 according to the second embodiment of the invention. FIG. 11 shows each row of movable supports 64 in a single continuous block which extends parallel to a length of the mold chase 14 from one side of the molding apparatus 10' to the other according to a first arrangement of the movable supports 64. Successive rows of movable supports 64 are separated by the intermediate piezoelectric actuators 61. As discussed in FIGS. 9 and 10, more precise tuning of two adjacent rows of movable supports 64 allows localized adjustment of the clamping pressure to achieve the desired upward pressure on the bottom mold chase 14.

FIG. 12 illustrates a second arrangement of the movable supports 64 of the molding apparatus 10' wherein each row of movable supports 64 is further subdivided into segments. Each intermediate piezoelectric actuator 61 is also further subdivided into segments with the same lengths as the segments of movable supports 64. Both the movable supports 64 and the intermediate piezoelectric actuators 61 are divided along lines which run perpendicularly to the lengths of the movable supports 64.

Each subdivided segment of a first movable support 64 is configured to be individually movable relative to another subdivided segment of a second movable support 64 next to it in directions perpendicular to the lengths of the movable supports 64 by actuation of a subdivided segment of the intermediate piezoelectric actuator 61 connected to it. Tuning of each row of movable supports 64 is further refined compared to the first arrangement of the movable supports 64 by controlling the expansion or contraction of a specific pair of actuators from the subdivided intermediate piezoelectric actuators 61 adjacent to each subdivided segment of the movable supports 64. A higher precision in adjusting the upward pressure at a smaller location on the bottom mold chase 14 can be achieved as compared to the first arrangement of the movable supports 64. This leads to even more precise control of the uniformity of the clamping pressure on the lead frame 50.

It should be appreciated that the clamping load of the molding apparatus of the present invention is placed on the movable supports instead of on the piezoelectric actuators, unlike in the prior art. This arrangement reduces the risk of cracking of the piezoelectric actuators. The expansion or contraction of the piezoelectric actuators efficiently controls the sliding of adjoining wedges comprised in the movable supports to create a localized upward pressure and hence adjusts the clamping pressure locally as required.

It should also be appreciated that the molding apparatus 10 according to the first embodiment of the invention is suitable for molding a single IC package or relatively small number of IC packages on a single electronic device where localized control of clamping pressure at the center of the lead frame is less important. That is, the first embodiment is appropriate if a more uniform clamping pressure obtained along the edge of the lead frame suffices for molding purposes.

The molding apparatus 10' according to the second preferred embodiment of the present invention has the benefit of enabling the adjustment of the expansion or contraction of intermediate piezoelectric actuators next to designated individual sections of movable supports allowing a more precise tuning of the clamping pressure on the lead frame by varying the electrical voltages applied to the said intermediate piezoelectric actuators. Where the movable supports can be further segmented, more refined adjustment of each segment of the movable supports allows greater scope for fine-tuning of the clamping pressure on smaller areas of the lead frame. Therefore, the molding apparatus of this embodiment is useful for molding numerous packages simultaneously with minimal bleeding or mold flash formation, especially for molding devices located at the central portion of the lead frame where clamping pressure might otherwise be weaker than along the edges of the lead frame.

Another advantage of the present invention is that using wedges instead of supporting piezoelectric pillars directly to apply clamping pressure provides a greater area of contact of the wedges with the mold chase and lead frame, which enhances heat transfer from the heater plate to the packages. Since the prior art molding apparatus has air gaps between the supporting piezoelectric pillars, heat transfer from the heater plate to the mold cavity is not even. In comparison, the separate support layers according to the preferred embodiments of the invention are in contact with each other and are more closely packed in layers with minimal air gaps existing between the mold cavity and the heater plate. As the movable supports are made of material of relatively higher heat conductivity than the piezoelectric actuators, better heat transfer is possible as compared to having substantial areas of the heat transfer path from the heater plate occupied by piezoelectric actuators.

The invention described herein is susceptible to variations, modifications and/or additions other than those specifically described and it is to be understood that the invention includes all such variations, modifications and/or additions which fall within the spirit and scope of the above description.

The invention claimed is:

1. Molding apparatus comprising:
   first and second mold chases that are configured to clamp an electronic device therebetween;
   a driving mechanism that is operative to drive the first and second mold chases to apply a clamping force onto the electronic device; and
   a pressure adjustment mechanism in communication with at least one of the mold chases and which is operative to apply an additional clamping pressure onto one or more portions of the mold chase;
   wherein the pressure adjustment mechanism further comprises movable supports that are displaceable in directions which are substantially perpendicular to the direction of the clamping force to thereby transmit and apply the said additional clamping pressure onto the mold chase, and a plurality of piezoelectric actuators which are operative to apply displacement forces to the movable supports in their displacement directions.

2. Molding apparatus as claimed in claim 1, wherein the movable supports comprise at least a first support layer that is configured to be movable along a first axis and a second support layer that is parallel to the first support layer and configured to be movable along a second axis which is orthogonal to the first axis, the first and second axes being substantially perpendicular to the direction of the clamping force.

3. Molding apparatus as claimed in claim 2, wherein the first support layer comprises a single movable support and the second support layer comprises a plurality of movable supports which extend adjacent to the first support layer.

4. Molding apparatus as claimed in claim 2, further comprising a third support layer that is configured to be movable in both the first and second orthogonal axes.

5. Molding apparatus as claimed in claim 4, wherein the third support layer is located between the first and second support layers.

6. Molding apparatus as claimed in claim 5, further comprising a first pair of piezoelectric actuators which is connected only to the first and third support layers, and a second pair of piezoelectric actuators which is connected only to the second and third support layers.

7. Molding apparatus as claimed in claim 5, wherein the third support layer is slidable relative to the first and second support layers and is further configured to slide in opposite directions to the displacement directions of the first and second support layers respectively in operation.

8. Molding apparatus as claimed in claim 2, wherein the separate support layers are in contact with each other and are closely packed.

9. Molding apparatus as claimed in claim 8, wherein the movable supports are made of material of relatively higher heat conductivity than the piezoelectric actuators.

10. Molding apparatus as claimed in claim 1, wherein the piezoelectric actuators further comprise a first piezoelectric actuator attached to the movable supports on one side of the molding apparatus and a second piezoelectric actuator attached to the movable supports on an opposite side of the molding apparatus.

11. Molding apparatus as claimed in claim 10, wherein the movable supports comprise multiple movable support sections extending parallel to a length of the mold chase, and at least one other piezoelectric actuator intermediately connected between two adjacent movable support sections.

12. Molding apparatus as claimed in claim 11, wherein the position of each movable support section is individually controllable by the piezoelectric actuator connected to it.

13. Molding apparatus as claimed in claim 11, wherein the movable support sections and piezoelectric actuators further comprise subdivided segments that are divided along lines which run perpendicularly to the lengths of the movable support sections.

14. Molding apparatus as claimed in claim 13, wherein each subdivided segment of movable support is configured to be individually movable relative to another subdivided segment of movable support next to it in directions perpendicular to the lengths of the movable supports by actuation of a subdivided segment of piezoelectric actuator connected to it.

15. Molding apparatus as claimed in claim 1, further comprising a protective plate on which the movable supports are slidably mounted and which the movable supports are slidable with respect thereto.

16. Molding apparatus as claimed in claim 15, further comprising another protective plate mounted to an opposite side of the movable supports which the movable supports are slidable with respect to.

17. Molding apparatus as claimed in claim 1, wherein each movable support is formed in the shape of a wedge, such that an inclined surface of the wedge is facing the first and/or second mold chases.

18. Molding apparatus as claimed in claim 17, wherein the inclined surface of the wedge is slidable relative to another surface which it is in contact with along a tapered slope having a gradient which is substantially less than a frictional angle between the respective surfaces.

19. Molding apparatus as claimed in claim 1, wherein each piezoelectric actuator comprises two arms, wherein one arm is connected to the movable supports and the other arm is connected to a mold chase.

20. Molding apparatus as claimed in claim 19, wherein the mold chase has an inclined surface facing an inclined surface of the movable supports.

* * * * *